United States Patent
Gulick et al.

(10) Patent No.: US 6,823,403 B2
(45) Date of Patent: Nov. 23, 2004

(54) DMA MECHANISM FOR HIGH-SPEED PACKET BUS

(75) Inventors: Dale E. Gulick, Austin, TX (US); Siegfried Kay Hesse, Dresden (DE)

(73) Assignee: Advanced Micro Devices, Inc., Sunnyvale, CA (US)

(*) Notice: Subject to any disclaimer, the term of this patent is extended or adjusted under 35 U.S.C. 154(b) by 264 days.

(21) Appl. No.: 10/184,407

(22) Filed: Jun. 27, 2002

(65) Prior Publication Data

US 2003/0172224 A1 Sep. 11, 2003

(30) Foreign Application Priority Data

Mar. 27, 2002 (DE) .......................... 102 13 839

(51) Int. Cl.[7] .............................. G06F 13/28
(52) U.S. Cl. .................. 710/22; 710/4; 710/33; 711/100; 712/225
(58) Field of Search .................. 710/1, 4, 20, 22, 710/26–28, 31, 33, 35, 52, 54, 74; 712/34, 225; 711/172, 113, 100

(56) References Cited

U.S. PATENT DOCUMENTS

| | | | | |
|---|---|---|---|---|
| 5,465,357 A | * | 11/1995 | Bealkowski et al. | ........... 713/2 |
| 5,522,062 A | * | 5/1996 | Yamaki | ........................ 711/172 |
| 5,890,207 A | * | 3/1999 | Sne et al. | ................... 711/113 |
| 6,098,113 A | * | 8/2000 | Heil et al. | ...................... 710/1 |
| 6,434,688 B1 | * | 8/2002 | Rhoden et al. | ............... 712/34 |

* cited by examiner

Primary Examiner—Jeffrey Gaffin
Assistant Examiner—Alan Chen
(74) Attorney, Agent, or Firm—Meyertons Hood Kivlin Kower & Goetzel, P.C.; B. Noël Kivlin

(57) ABSTRACT

A DMA (Direct Memory Access) mechanism is provided that may be of improved performance in particular in connection with high-speed packet buses. A transmit DMA engine for outputting read requests for a memory interface and receiving requested data from the memory interface, comprises a data transfer initiating unit for outputting first address data identifying a first memory range. Further, a boundary alignment unit is provided for generating second address data using the first address data, where the second address data identifies a second memory range that differs from the first memory range in at least one boundary. Further a corresponding boundary alignment may be done in a receive DMA engine. The DMA mechanism may be performed in a USB-2 host controller that has HyperTransport capabilities.

72 Claims, 10 Drawing Sheets

DMA MECHANISM FOR HIGH-SPEED PACKET BUS

BACKGROUND OF THE INVENTION

1. Field of the Invention

The invention generally relates to DMA (Direct Memory Access) controller devices and methods, and in particular to DMA mechanisms that allow direct memory access over a high-speed packet bus, such as in HyperTransport™ based USB-2 (Universal Serial Bus) host controllers.

2. Description of the Related Art

In present computer systems, one way of relieving the central microprocessing unit of performing repetitive input/output functions is to avoid interrupts and to realize these functions by means of a DMA controller which is a control unit that enables direct memory access. Before the actual input/output process takes place, the processor initializes the DMA controller by writing initialization data to its registers, and the DMA controller is then able to independently perform data transfers between memory and interface. That is, during the phase where the control and address registers are initialized, the controller acts as slave. However, as soon as the controller receives a transfer request and begins data transmission, the controller independently performs bus cycles, i.e. it acts as master and shares the bus with the processor, for memory access.

FIG. 1 depicts a conventional system employing a DMA controller. In this system, the processor 100 is connected to the memory 105, the DMA controller 110 and a device control unit 120 that controls the peripheral device 125. Dependent on the mode of operation of the DMA controller 110, the data transfer between memory 105 and device control unit 120 may be performed directly or indirectly, i.e. by means of a buffer 115. In the direct transfer mode, the DMA controller 110 requires only one bus cycle per data item by addressing the memory 105 via the address bus and at the same time, addressing the interface data registers via a control line (single address mode). In the indirect transfer mode, the DMA controller 110 first performs a read cycle and stores the read data in the buffer 115. In a subsequent write cycle, the DMA controller 110 then transfers the buffered data to the respective target unit. Memory and interface are both addressed via the address bus (dual address mode).

While there are many different implementations of a DMA controller possible in a computer system, one example is a DMA controller that forms part of a USB 2.0 compliant host controller. USB was originally developed in 1995 to define an external expansion bus which facilitates the connection of additional peripherals to a computer system. The USB technique is implemented by PC (Personal Computer) host controller hardware and software and by peripheral-friendly master-slave protocols and achieves robust connections and cable assemblies. In USB systems, the role of the system software is to provide a uniformed view of the input/output architecture for all applications software by hiding hardware implementation details. In particular, it manages the dynamic attach and detach of peripherals and communicates with the peripherals to discover their identity. During run time, the host initiates transactions to specify peripherals, and each peripheral accepts its transactions and response accordingly.

While these functions and protocols were already implemented in the USB 1.1 specification, this technique was still improved in order to provide a higher performance interface. In USB 2.0 compliance systems, the speed improvement may be up to a factor of 40. Moreover, USB 2.0 is backwards compatible with USB 1.1.

In USB 2.0 compliant hosts, e.g. personal computers, the high-speed USB 2.0 functionality is performed by an enhanced host controller that operates in compliance with the EHCI (Enhanced Host Controller Interface) specification for USB 2.0. While this specification defines the register-level interface and associated memory-resident data structures, it does not define nor describe the hardware architecture required to build a compliant host controller.

To satisfy the demand for high-speed chip-to-chip communication in computer systems, for instance in connection with EHCI compliant USB host controllers, the HyperTransport technology was developed which provides a high-speed, high-performance point-to-point on-board link for interconnecting integrated circuits on a motherboard. It can be significantly faster than other bus technologies for an equivalent number of pins. The HyperTransport technology is designed to provide significantly more bandwidth than current technologies, to use low-latency responses, to provide low pin count, to be compatible with legacy computer buses, to be extensible to new system architecture buses, to be transparent to operating systems, and to offer little impact on peripheral drivers.

While the HyperTransport interface thus provides a high-speed chip-to-chip interface, data processing performed within the chips itself may often become the bottle neck. In particular the present DMA mechanisms may decrease the overall performance since they prevent the full performance provided by on-board interchip interfaces such as the Hyper-Transport interface from being brought down to the peripherals.

SUMMARY OF THE INVENTION

A DMA mechanism is provided that may improve the performance in particular when performing direct memory access over a high-speed packet bus.

In one embodiment, a DMA controller device is provided that has a transmit DMA engine for outputting read requests to a memory interface and receiving requested data from the memory interface. The transmit DMA engine comprises a data transfer initiating unit for initiating a data transfer by determining which data is to be fetched from memory and outputting first address data identifying a first memory range. The first memory range contains the determined data to be fetched. The transmit DMA engine further comprises a boundary alignment unit for receiving the first address data, generating second address data therefrom, and outputting the second address data. The second address data identifies at least one second memory range that differs from the first memory range in at least one boundary. Further, the transmit DMA engine comprises a read request building unit for receiving the second address data and generating at least one read request based thereon.

In another embodiment, there may be provided a DMA controller device that has a receive DMA engine for writing data to a memory interface. The receive DMA engine comprises a write command building unit for determining which data is to be written to memory, determining first address data that identifies a first memory range where the first memory range is the memory range to which the determined data is to be written, and building at least one write command to write the determined data. The write command building unit includes a boundary alignment unit for generating second address data based on the first address data. The second address data identifies at least one second memory range that differs from the first memory range in at least one boundary. The write command building unit is arranged for building the at least one write command to write the determined data to the at least one second memory range.

In a further embodiment, a USB host controller is provided for handling the data traffic between at least one USB device and a system memory of a computer system. The USB host controller comprises a transmit and/or receive DMA engine. The transmit DMA engine is arranged for outputting read requests to a memory interface and receiving requested data from the memory interface. The receive DMA engine is arranged for writing data to the memory interface. The transmit and/or receive DMA engine comprise an address data generating unit for generating and outputting first address data that identifies a first memory range. The first memory range contains the determined data to be fetched, or is the memory range to which the determined data is to be written. The transmit and/or receive DMA engine further comprises a boundary alignment unit for receiving the first address data and generating second address data therefrom. The second address data identifies at least one second memory range that differs from the first memory range in at least one boundary.

According to yet another embodiment, a method of operating a DMA engine to handle the data traffic between at least one peripheral device and a system memory of a computer system comprises determining first address data identifying a first memory range, determining whether the first memory range is boundary aligned, and if the first memory range is not boundary aligned, generating second address data from the first address data. The second address data identifies at least one second memory range that differs from the first memory range in at least one boundary.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
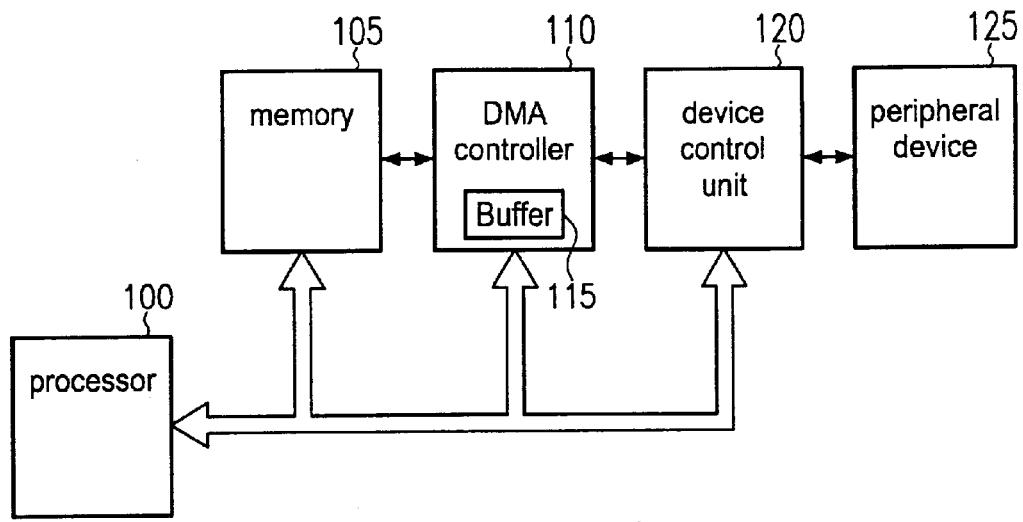
FIG. 1 illustrates a conventional computer system including a DMA controller.
Figure 2:
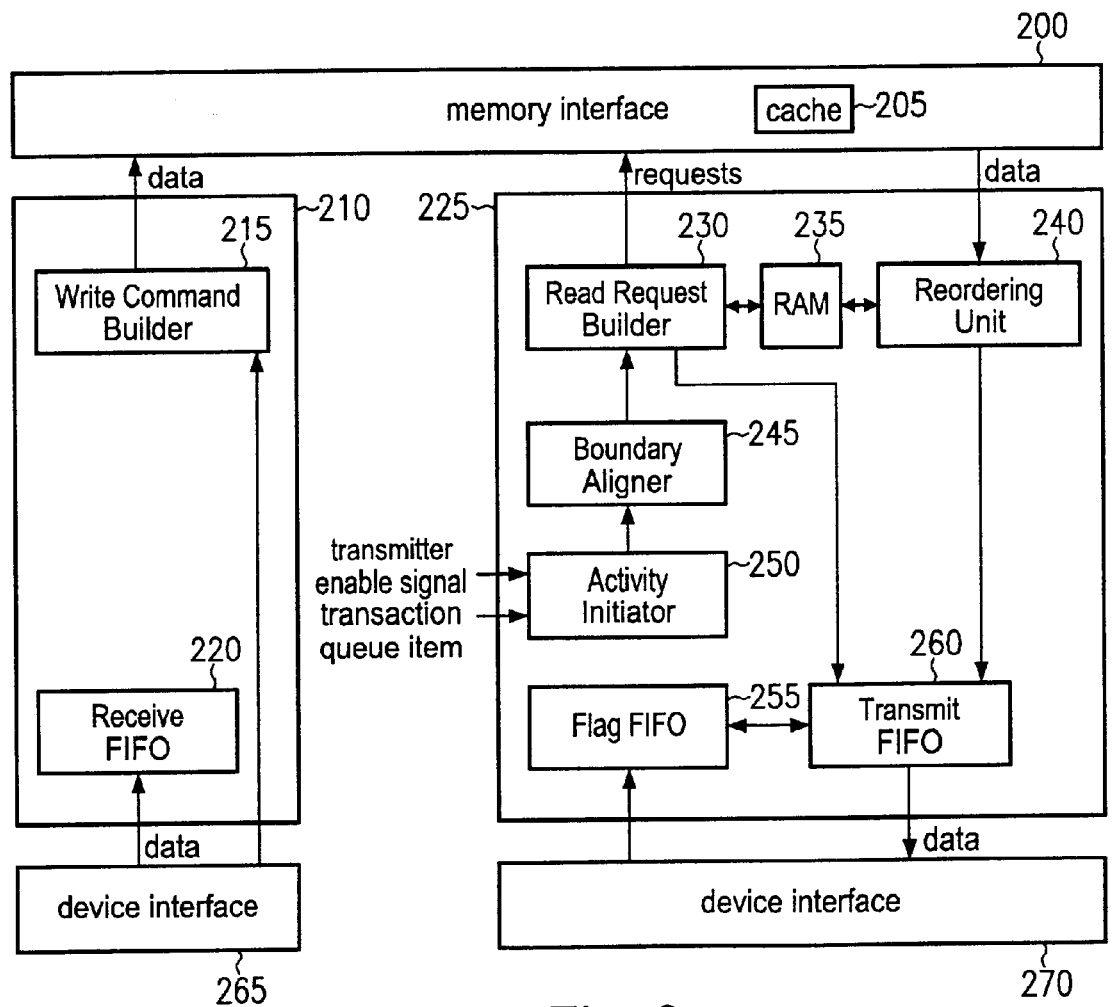
FIG. 2 illustrates the hardware components of a DMA controller according to a first embodiment.

Referring now to the drawings and particularly to FIG. 2, which illustrates a first embodiment of a DMA controller, this architecture may be thought as residing between a HyperTransport compatible memory interface 200 which buffers data in a cache 205, and a USB-2 EHCI host controller. It is to be noted that in other embodiments, other high-speed memory interfaces may be used, as well as other host controllers.

Data is moved to and from memory by the DMA controller in response to commands from the host controller and paced by levels in the associated transmit and receive buffers. It is to benoted that the terms "transmit" and "receive" are used herein to denote directions with respect to the connected peripheral device(s). In the transmit direction where the controller reads from memory, the host controller generates a queue of requests. The DMA controller looks into its queue and identifies the next command to be processed. The command may contain a base address of 32 bits and a length of 11 bits. The operation of the controller will be discussed in more detail below.

In the present embodiment where the HyperTransport technology is used, the controller depicted in FIG. 2 is arranged to follow certain rules. For instance, no transaction may span a cache line boundary, i.e. a 64-byte natural alignment is performed to best deal with the 64-byte maximum packet size. Moreover, as many transactions as possible are 64 bytes in length. That is, the controller first sends data (or requests read data) for a partial cache line to get aligned, then sends (or requests) cache line sized packets, and ends with any remaining partial cache line packet (or the respective read request thereof). Further, the controller may be arranged for enforcing HyperTransport ordering rules and dealing with responses that come back out of order. In the present embodiment, the minimum data packet is a double word (dword). Transfers of non-dword-aligned data may use a masked dword command. Thus, in addition to cache line alignment, dword alignment may be maintained. This will also be discussed in more detail below.

Turning now again to FIG. 2, the DMA controller comprises a transmit DMA engine 225 and a receive engine 210. Both DMA engines are connected to the memory interface 200 for exchanging data and, in case of the transmit DMA engine, requests. The DMA engines are further connected to the respective device interfaces 265, 270.

The role of the transmit DMA engine 225 is to fetch data from memory, via the memory interface 200, and place it in a transmit buffer 260 for use by the packet builder.

As can be seen from FIG. 2, the transmit DMA engine 225 includes an activity initiator 250. When the controller is turned on, the activity initiator 250 will determine the data to be moved from/to memory, and pass it to the boundary aligner 245 to begin processing. The activity initiator 250 selects the first transaction it encounters and passes it to the boundary aligner 245 to begin processing. The boundary aligner 245 creates activity for the read request builder 230. The read request builder 230 is paced by the availability of space in the transmit FIFO (First In First Out) buffer 260. In case of further outgoing transactions, the associated parameters are routed to the boundary aligner 245 and read request builder 230. When the transaction queue is empty or the transmitter is disabled, the activity initiator 250 generates a disable signal to the rest of the transmit DMA engine 225. For allowing the activity initiator 250 to determine whether the transaction queue is empty or the transmitter is disabled, it may receive a transmitter enable signal and a transaction queue item signal.

The boundary aligner 245 of the present embodiment is a 64-byte aligner that takes the base address (ADDR[31:0]) and size (SIZE[10:0]) as inputs and generates address and length outputs for individual requests. The input size is for determining how many bytes are needed. The requests are then broken up on dword and cache line address boundaries. Further, they may be broken up on dword length boundaries when partial dwords are requested separately. If the size is less than three and the address is not aligned, this could result in multiple transactions of only one or two bytes. The process of how to handle the case where the user of the data does not have provision for discarding unwanted portions of a dword, will be discussed in more detail below with reference to FIGS. 6 and 7.

The read request builder 230 is for communicating read requests to the memory interface 200. The boundary aligner 245 creates work for the read request builder 230. These are either sized reads with an integer number of dwords, or masked reads of less than one dword. The requests are sent to the memory interface 200. In the present embodiment, inputs from the boundary aligner 245 are dwords or sub-dwords, base addresses, mask values, and dword counts.

The read request builder 230 supplies the source tags in ascending order (wrapping). The read request builder 230 is connected to a RAM (Random Access Memory) 235 that stores a transaction flag, and further provides the buffer base pointer for storing the returned data. Storing the transaction flag is required so that the boundary between packets can be delineated in the transmit FIFO 260. The source tags serve as an index into the RAM 235. The associated start flag bit is set when the first request of a transaction is sent to the memory interface 200. As each response is received, its source tag is used to index the RAM 235. If the associated bit is set, the first byte of data is tagged as the start of a new data packet. The bit is then cleared. There can be any number of RAM bits set at any one time, corresponding to individual outstanding transactions.

In the present embodiment, read requests are not sent to the memory interface 200 unless there is room in the transmit FIFO 260. Requests are not accepted by the memory interface 200 unless it has buffer space for the response. The read request builder 230 may attempt to send requests as fast as the memory interface 200 will accept them, and the limit to the number of outstanding transactions is enforced by the memory interface 200.

The transmit FIFO 260 may be organized as eight 256-byte buffers where any four contiguous buffers can be combined to form a buffer which is up to 1K long. Any given data packet can span up to four buffers, but an individual buffer can only hold data from one packet. When labelling the eight buffers by [H:A], the buffers are laid out in a circle, i.e. A, B, C, D, E, F, G, H, A, B . . . , so that a 1K buffer could occupy buffers G, H, A, B.

In the present embodiment, the buffers are physically a single RAM with 11-bit load and unload pointers. The lower eight-bits index into the blocks and the upper three bits may specify the block.

When a transaction is processed, the buffer(s) required to store the associated data are reserved, preserving the FIFO ordering of transactions in the transmit FIFO 260. The "reservation" may simply take the form of a three-bit counter that points to the next buffer.

Focusing now on the reordering mechanism, the memory interface 200 which may be HyperTransport compatible, can return a series of read responses out of order. It may therefore be the responsibility of the transmit DMA engine 225 to place them in the transmit FIFO 260 in the correct order. The order is ascertained by the source tag fields. For this purpose, the transmit DMA engine 225 comprises a reordering unit 240.

The source tag indexes into a 32×12-bit RAM. The least significant 11 bits are the offset into the buffer. The twelfth bit is the start-of-transaction flag. The base address and start flag are written when the tag is assigned.

As apparent from FIG. 2, the transmit DMA engine 225 further includes a flag FIFO 255, in order to have a mechanism that informs the user of the DMA data, e.g. the USB packet builder, that all of the data for a given transaction has been fetched and resides in the transmit FIFO 260. The flag FIFO 255 may take the form of an eight-entry FIFO, corresponding to the buffer(s) A–H. The flag FIFO 255 may have two bits per entry: an all-data-present bit and a packet boundary flag. The all-data-present bit is a flag indicating that all data is present. The packet boundary flag corresponds to the QTAG (queue tag) bit in the transaction item. This mechanism allows the data in the transmit FIFO 260 to be correctly aligned with the transaction item.

In case of a USB transmitter, there may be the requirement to inform the transmit FIFO 260 when the data are no longer needed. Specifically, the act by the transmitter of reading the transmit FIFO 260 may not empty it. Rather, the transmitter sends an indication to the flag FIFO 255 to free up the just used locations. This may be done for handling retransmissions which may be allowed for some packet types.

While the transmit DMA engine 225 is for handling reads from memory, the device of FIG. 2 further includes a receive DMA engine 210 for handling writes to the memory. The receive DMA engine 210 comprises a receive FIFO 220 and a write command builder 215, and it interfaces to the device such as a USB receiver, via device interface 265.

The reverse process to the transmit case takes place for the receiver except that the receiver does not need to hold all of the data from the packet until the complete packet has arrived and is verified as error-free. It may only be a double 64-byte FIFO buffer 220 required, assuming that an incoming transaction will not be started unless the memory interface 200 has sufficient buffering to handle an entire packet.

Turning now to the write command builder 215 of the receive DMA engine 210, sized writes are used in the present embodiment which may be sent in a HyperTransport posted virtual channel. As with the transmit DMA engine 225, cache-line alignment may be performed. Writes can be any number of contiguous dwords long, or they can be byte oriented. As a practical matter, the write command builder 215 may send a single 0 to 3 byte transaction to become dword aligned, send a single 0 to 15 dword transaction to become cache aligned, send a number of 16-dword transactions, send a 0 to 15 dword transaction containing the last integer dwords in the packet, and send a single 0 to 3 byte transaction with any non-integral portions of a dword. The transactions are sent as soon as the requisite data has been received into the receive FIFO 220. This means that the write command builder 215 may examine the transaction item to determine the address/size alignment in advance and determine the number of bytes or dwords required to meet the above rules. The address, mask, and count fields may be set as appropriate.

It is to be noted that within the receive DMA engine 210, there may be no need to force reordering at the memory controller, so tags and sequence identifiers are not required.

The receiver may provide, via device interface 265, an indication to the write command builder 215 when it has received the end of a packet. This is to allow the receive FIFO 220 to be emptied of any remaining bytes.

Data received via device interface 265 is processed by stripping the data from the rest of the packet. The data portion is loaded into the receive FIFO 220. Two options may be employed: byte wide or dword wide organization. If the receive FIFO 220 is byte wide, there may be no alignment issues. If the receive FIFO 220 is organized with a dword width, the receive DMA engine 210 will extract dwords and realign the data to match address dword boundaries.

The receive DMA engine 210 of the present embodiment may extract data from the receive FIFO 220 based on the following rules, i.e. based on the alignment of the address field in the transaction item and the end-of-received-packet indication from the receiver: If the data is not dword aligned, 1 to 3 bytes are extracted as soon as they are present and a sized write transaction is created with the appropriate mask bits set. If the data is not cache-line aligned, 1 to 15 dwords are extracted as soon as they are present and a sized write transaction is created with the count field set appropriately. Sized write transactions are created in 64-byte chunks as 64 bytes become available. This continues as long as 64-byte chunks of data are being received. If the end-of-received-packet indication from the receiver goes active, the remaining contents of the receive FIFO 220 are transmitted as either one or two transactions depending upon the number of bytes to be sent. Assuming less than 64 bytes are in the receive FIFO 220, first a transaction containing an integral dword is sent with the appropriate count values set. After this, any remaining bytes are sent with the appropriate mask bits set.

Figure 3:
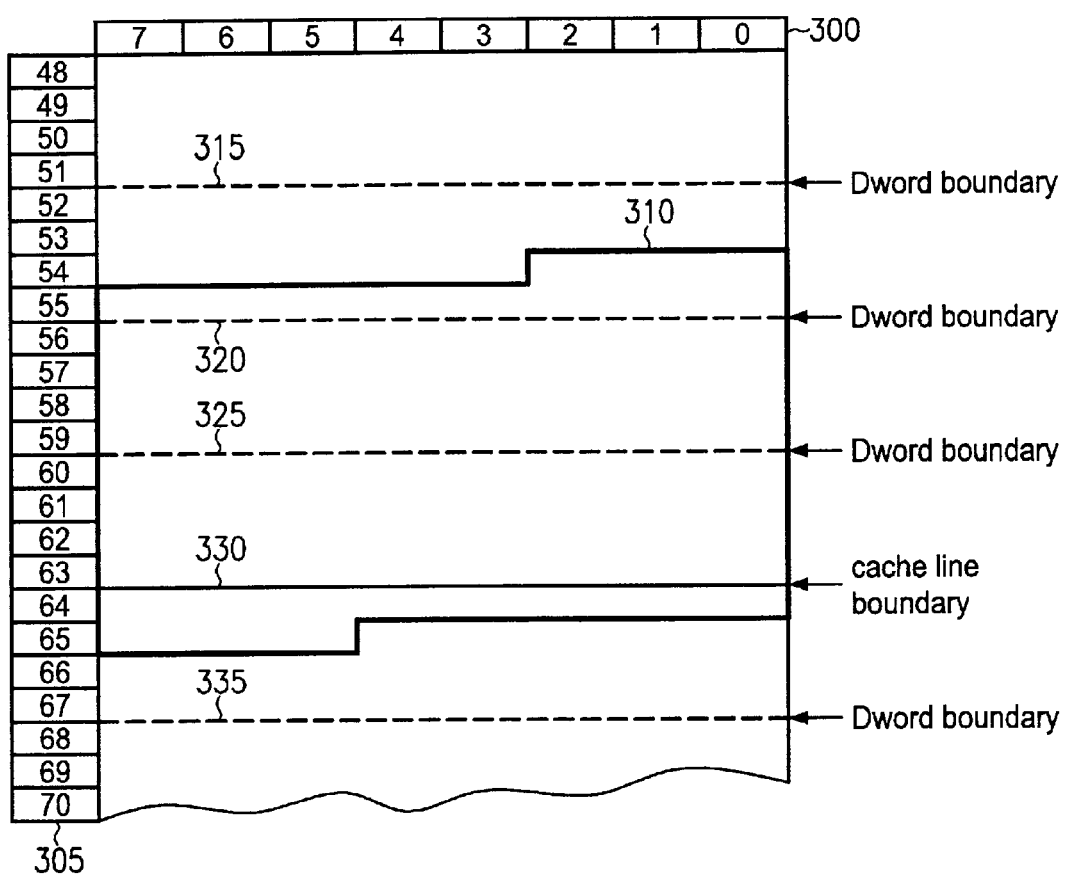
FIG. 3 depicts a part of the address space for illustrating memory range boundaries.

As apparent from the foregoing, in both the transmit and receive DMA engines 225, 210 boundary alignments may be performed. In this context, boundary alignment means to receive first address data that indicates a first memory range, and generate second address data therefrom that indicates at least one second memory range that differs from the first memory range in at least one boundary. For explanatory reasons, this may be better understood referring to FIG. 3.

In this figure, a part of the memory is depicted. The memory stores a plurality of bytes 305, each having eight bits 300. In the present embodiment, a dword comprises four bytes so that there are dword boundaries 315, 320, 325, 330, 335.

Further, there are cache-line boundaries 330 which result from the fact that the cache 205 is organized in cache lines which, in the present embodiment, have a size of 64 bytes. A cache-line boundary may at the same time be a dword boundary.

If a memory range 310 is to be read or written which has a dword boundary or cache-line boundary in it, the boundary alignment may be done by dividing this memory range into sub ranges which may be processed separately. This will be discussed in more detail with reference to the flowcharts of FIGS. 4 to 9.

Figure 4:
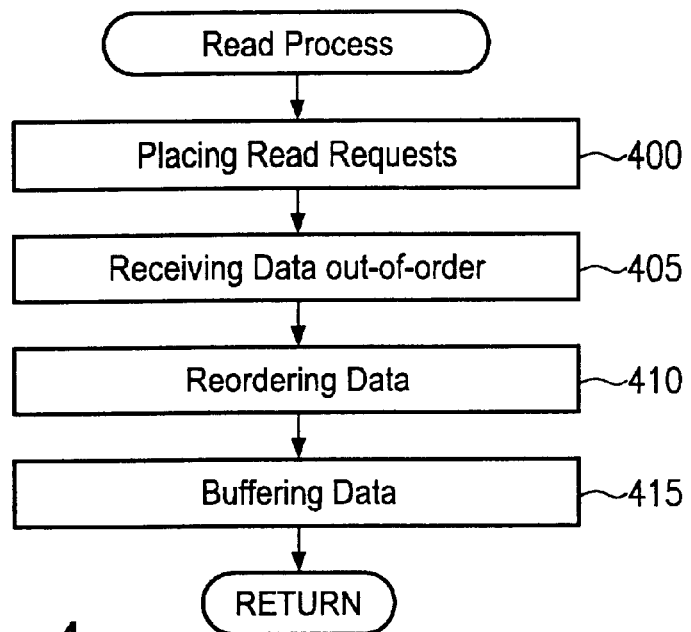
FIG. 4 is a flowchart illustrating the read process that may be performed by the DMA controller of FIG. 2.

FIG. 4 depicts the main process steps when reading data. First, read requests are placed in step 400 by the transmit DMA engine 225. In step 405, the transmit DMA engine 225 receives the data, which may arrive out of order. The reordering unit 240 of the transmit DMA engine 225 then reorders the data in step 410, and the reordered data is buffered in step 415 in the transmit FIFO 260.

Figure 5:
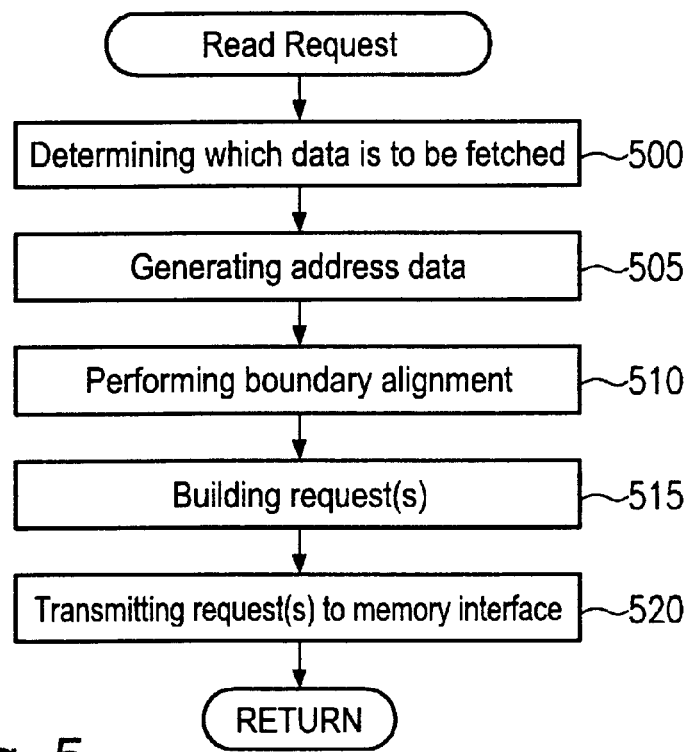
FIG. 5 is a flowchart illustrating an embodiment of how to perform read requests in the process of FIG. 4.

An example of what is actually done in step 400 of placing read requests is shown in FIG. 5. First, it is determined by activity initiator 250 which data is to be fetched (step 500). Then, the boundary aligner 245 generates address data in step 505 and performs the boundary alignment in step 510. Finally, the read request builder 230 builds one or more requests in step 515 and transmits the requests to the memory interface 200 in step 520.

Figure 6:
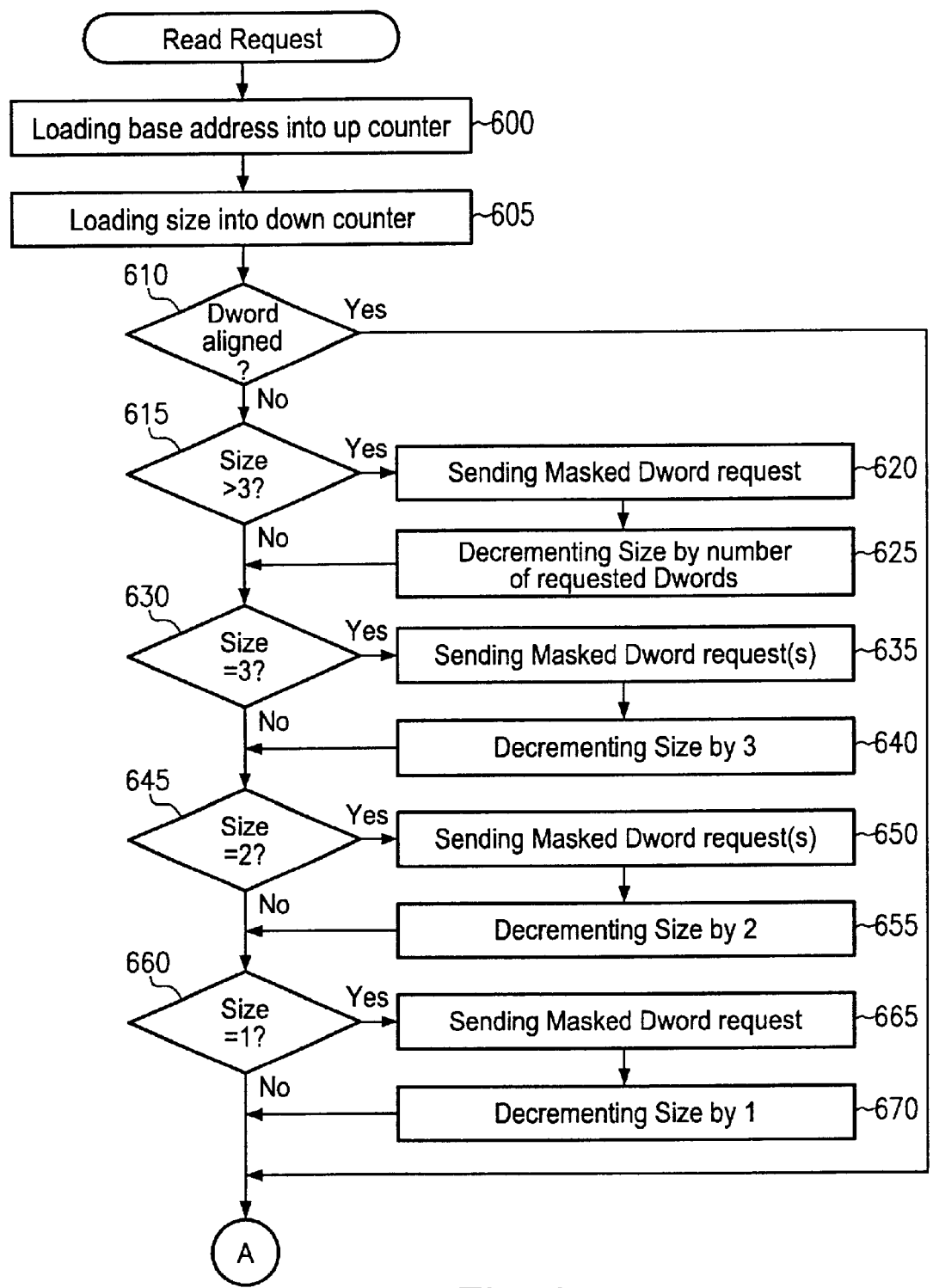
FIG. 6 is a flowchart illustrating the first part of a read request process according to another embodiment.
Figure 7:
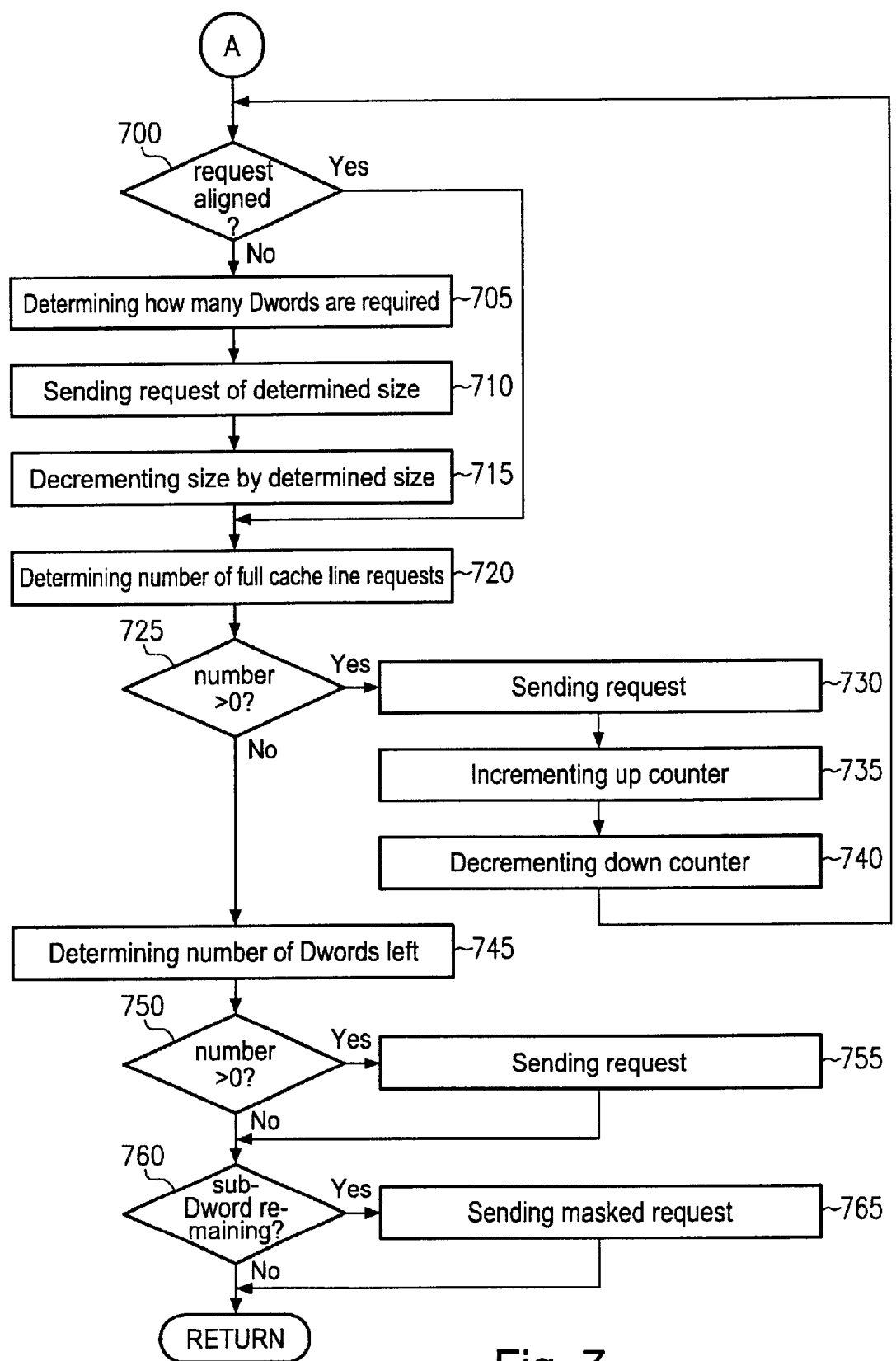
FIG. 7 is a flowchart illustrating the second part of the read request process of FIG. 6.

A more detailed example process of placing read requests is depicted in FIGS. 6 and 7, in particular for handling the case where the user of the data does not have provision for discarding unwanted portions of a dword, thus only the actual desired bytes of data are fetched from memory.

First, the base address is loaded into an up counter in step 600 which calculates the base address for each address. In step 605, the size is loaded into a down counter which counts the number of bytes left to be fetched. It is then checked in steps 610, whether the data is already dword aligned and if so, the process may continue with step 700. Otherwise, steps 615 to 670 are performed for dword aligning the data.

In detail, if there are more than three bytes left, a masked dword transaction is sent in step 620 and the number of outstanding bytes to be sent is calculated in step 625. Then, it is checked in steps 630, 645, 660 whether there are 3, 2 or 1 byte outstanding.

Depending on the result of respective checks, one or more masked dword requests with appropriately set mask bits are sent in steps 635, 650, 665, and the number of outstanding bytes is accordingly decremented in steps 640, 655, 670.

After having performed the dword alignment, it is checked in step 700 whether the request is cache-line aligned. If so, steps 705 to 715 may be skipped, but otherwise it is determined how many dwords are required, and a request of the determined size is sent. The size is then decremented by the determined size.

Then, it is determined in step 720 how many full cache lines are requested. If the number of full cache-line requests is non-zero, the respective requests are sent in steps 730, the up counter is incremented in step 735 and the down counter decremented in step 740. The process then returns to step 700.

Once all the full cache-line requests are sent, the remaining dwords and sub-dwords need to be handled. For this reason, step 745 determines the number of dwords left, and respective requests are sent in steps 755. The remaining sub-dwords are then requested by sending masked requests in step 765.

In the following, a pseudo-code is shown that corresponds to the process of FIGS. 6 and 7 and explains the alignment mechanism in a more elaborate manner:

```
Load ADDR[31:6] into an up counter
        // Up counter calculates the base address for each request
Load SIZE[10:0] into down counter
        // Counts number of bytes left to be fetched
If ADDR[1:0] ≠ 0 AND SIZE[10:0] > 3,
        // Not dword aligned, need to send a masked dword transaction
    Send a masked dword request with the mask bits set as follows
        ADDR[1:0] = 01 => 1110
        ADDR[1:0] = 10 => 1100
        ADDR[1:0] = 11 => 1000
    Decrement SIZE[10:0] by (4 minus ADDR[1:0])
        // Calculates the number of outstanding bytes to be sent
Else If ADDR[1:0] ≠ 0 AND SIZE[10:0] = 3
    Send masked dword request(s) with the mask bits set as follows
        ADDR[1:0] = 01 => 1110
        // one request of 3 bytes
        ADDR[1:0] = 10 => 1100 + 0001
        // two requests (2 bytes + 1 byte)
        ADDR[1:0] = 11 => 1000 + 0011
        // two requests (1 byte + 2 bytes)
    Decrement SIZE[10:0] by 3
        // Calculates the number of outstanding bytes to be sent
Else If ADDR[1:0] ≠ 0 AND SIZE[10:0] = 2
    Send masked dword request(s) with the mask bits set as follows
        ADDR[1:0] = 01 => 0110
        // one request of 2 bytes
        ADDR[1:0] =10 => 1100
        // one request of 2 bytes
        ADDR[1:0] =11 => 1000 + 0001
        // two requests (1 byte + 1 byte)
    Decrement SIZE[10:0] by 2
        // Calculates the number of outstanding bytes to be sent
Else If ADDR[1:0] ≠ AND SIZE[10:0] = 1
    Send a one byte masked dword request with the mask bits set as
    follows
        ADDR[1:0] =01 => 0010
        ADDR[1:0] =10 => 0100
        ADDR[1:0] =11 => 1000
    Decrement SIZE[10:0] by 1
        // Calculates the number of outstanding bytes to be sent
Else, goto next step
        // Already dword aligned
If the NAND of !ADDR[5:2] = 1,
        // The request is not aligned
    Increment !ADDR[5:2]
        // Subtraction to determine how many dwords are required
        // to achieve alignment
    Send request of this size
    Decrement SIZE[10:0] by this amount
        // Calculates number of bytes remaining to be fetched
Else, goto next step
        // Request is already aligned
Load SIZE[10:6] into a down counter
        // Counts number of 64-byte requests remaining
If SIZE[10:6] ≠ 0,
        // SIZE[10:6] = 0 means that there is not a full cache
        // line left
    Send 64-byte request
    Increment up counter
        // Calculates base address for next request
    Decrement down counter
        // Calculates number of 64-byte requests remaining
    Go back by two steps
        // Loop until there is not a full cache line left
Else If SIZE[5:2] ≠ 0, send request of length SIZE[5:2]
        // Last request with an integer number of even dwords
        // (partial cache line)
If SIZE[5:2] ≠ 0 AND SIZE[1:0] ≠ 0,
    Send masked request of length SIZE[1:0]
        // Remaining sub-dword
    Mask bits = SIZE[1:0] = 01 => 0001
            SIZE[1:0] = 10 => 0011
            SIZE[1:0] = 11 => 0111
Else, stop
        // SLZE[5:0] = 0, i.e. nothing left to fetch
```

Figure 8:
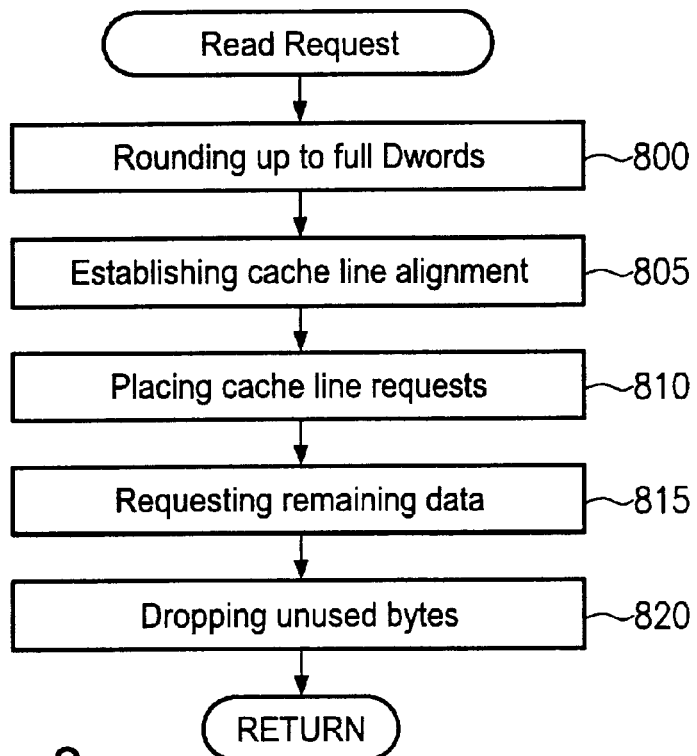
FIG. 8 is a flowchart illustrating another embodiment of performing a read request in the process of FIG. 4.

Turning now to FIG. 8, another example of performing the process of placing read requests is depicted. First, it is determined which data is to be fetched, and this data range is rounded up to full dwords in step 800. Then, a cache line alignment is established in step 805 essentially in line with the above discussed scheme. The cache line requests are then placed in step 810, and the remaining data is requested in step 815. Finally, unused bytes which had been added in step 800 when rounding up to full dwords, are dropped in step 820.

Figure 9:
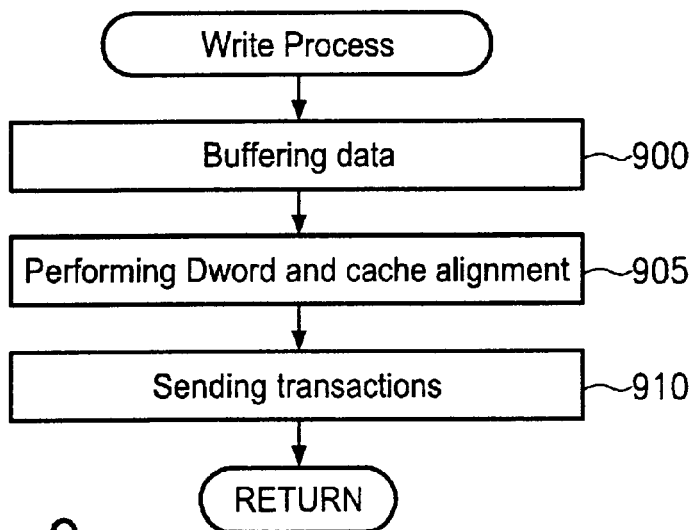
FIG. 9 is a flowchart illustrating a write process that may be performed by the DMA controller of FIG. 2.

As mentioned above, the boundary alignment techniques described so far may be performed in the transmit DMA engine 225 as well as in the receive DMA engine 210. While the previous flowcharts dealt with the read processes, i.e. the operation of the transmit DMA engine 225, FIG. 9 depicts a flowchart illustrating the steps of the corresponding write process. In step 900, the data received from the device interface 265 are buffered. Then, dword and cache alignments are performed in step 905 and corresponding transactions are sent to the memory interface 200 in step 910.

While the flowcharts of FIGS. 4 to 9 illustrates processes which may be performed in the controller of FIG. 2, it is to be noted that there may be other embodiments of such processes which may differ from the above discussed flowcharts in having the sequence of steps changed, having some steps dropped and others added.

Figure 10:
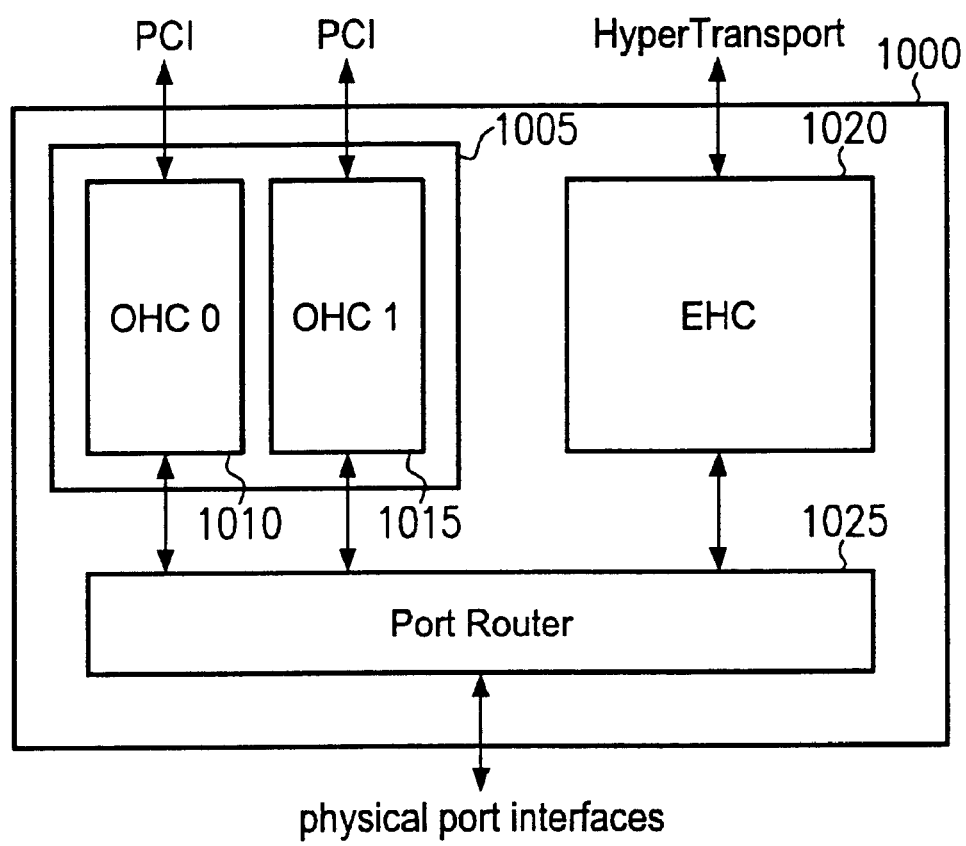
FIG. 10 illustrates the main components of the USB 2.0 compliant host controller that includes a DMA controller according to another embodiment.

Turning now to FIG. 10, a second embodiment will now be discussed. The figure illustrates a USB 2.0 compliant host controller 1000 which mainly has three components: an enhanced host controller (EHC) 1020, one of more companion host controllers 1005, and a port router 1025.

The enhanced host controller 1020 handles the USB 2.0 high speed traffic. Additionally, it controls the port router 1025. In the companion host controller unit 1005 of the present embodiment, there are two OHCI (Open Host Controller Interface) compliant host controllers, OHC0 1010 and OHC1 1015. These controllers handle all USB 1.1 compliant traffic and may contain the legacy keyboard emulation for non-USB aware environments. The port router 1025 assigns the physical port interfaces their respective owners.

The USB 2.0 compliant host controller 1000 of FIG. 10 may be defined as hardware architecture to implement an EHCI-compliant host controller 1020 for integration into a southbridge of a computer system. The host controller then resides between the USB-2 analog input/output pins and a link interface module for interfacing towards system memory. This interface may be an internal HyperTransport interface.

Figure 11:
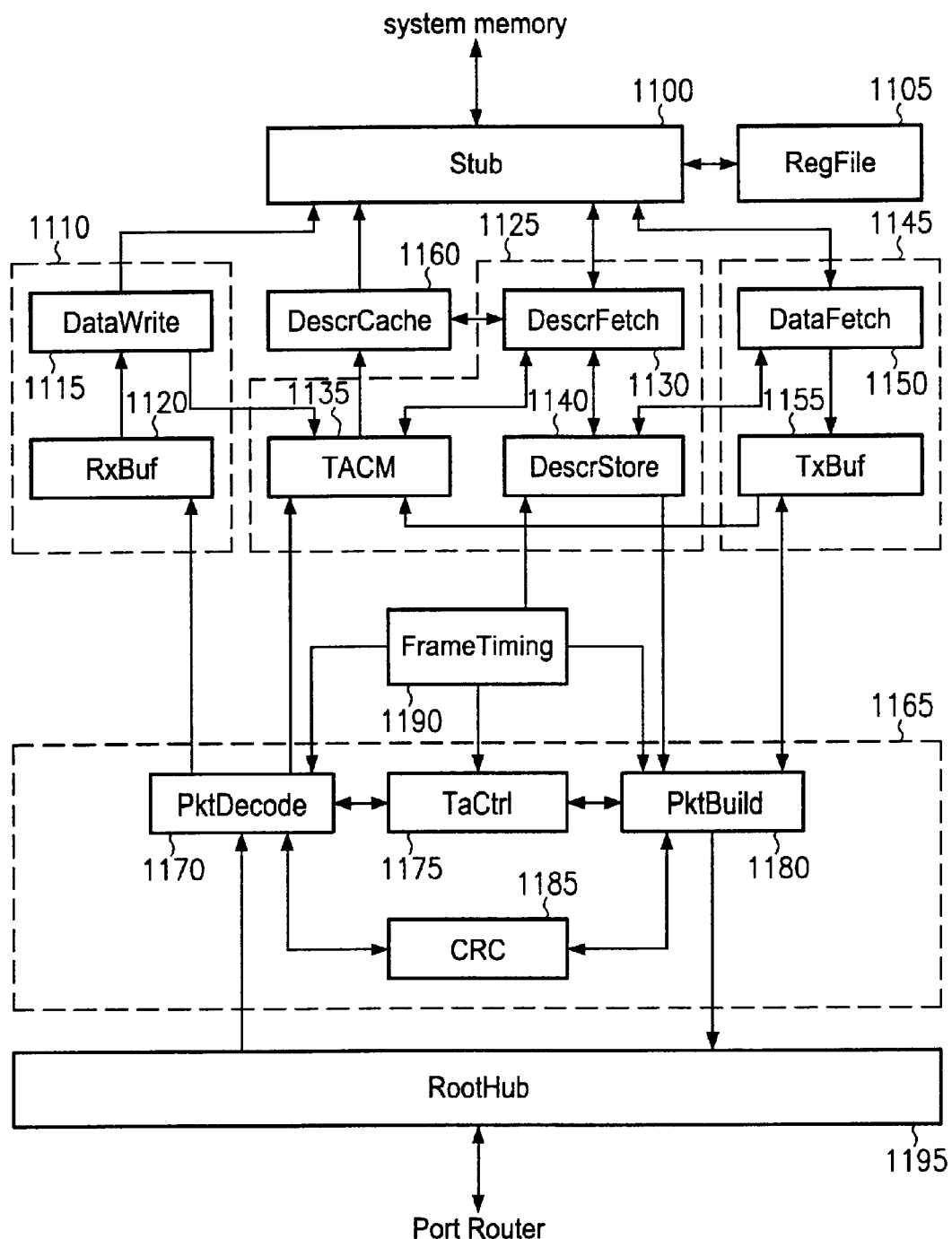
FIG. 11 is block diagram illustrating the components of the enhanced host controller that is a component of the arrangement of FIG. 10.

Turning now to FIG. 11, the components of the enhanced host controller 1020 are depicted in more detail. The handling of the data traffic to and from the system memory is done by the stub 1100. The stub 1100 assigns the internal sources and sinks to respective HyperTransport streams, i.e. posted requests, non-posted requests, and responses. The stub 1100 arbitrates the internal HyperTransport interface between all internal bus masters, i.e. the receive DMA engine 1110, the descriptor cache 1160, the descriptor processing unit 1125 and the transmit DMA engine 1145. Thus, the stub 1100 arbitrates between descriptor fetching, writing descriptors back, receiving and transmitting data.

The stub 1100 is connected to a register file 1105 that contains the EHCI registers. In the present embodiment, the EHCI registers store data with respect to the host controller capabilities and the host controller operational modes.

The descriptor processing unit 1125 is connected to the stub 1100 and consists of three sub-units: the descriptor fetching unit (DescrFetch) 1130, the descriptor storage unit (DescrStore) 1140 and the transaction completion machine (TACM) 1135. The descriptor fetching unit 1130 determines, based on timing information and register settings, which descriptor is to be fetched or pre-fetched next and sends the request to the stub 1100 and/or the descriptor cache 1160. When it receives the descriptor it sends it to the descriptor storage unit 1140. The transaction completion machine 1135 is connected to the descriptor fetching unit 1130 for managing the status write-back to descriptors. For this purpose, the transaction completion machine 1135 is connected to the descriptor cache 1160.

As apparent from the figure, there are further provided a transmit DMA engine 1145 and a receive DMA engine 1110. The transmit DMA engine 1145 consists of a data fetching unit (DataFetch) 1150 and a data transmit buffer (TxBuf) 1155. The data fetching unit 1150 is the DMA read bus master and inspects the entries in the descriptor storage unit 1140 of the descriptor processing unit 1125. The data fetching unit 1150 pre-fetches the corresponding data and forwards it to the data transmit buffer 1155. The data transmit buffer 1155 may be a FIFO buffer and its function corresponds to that of the descriptor storage unit 1140 in that it allows to pre-fetch enough data for outgoing transactions to cover the memory system latency.

The receive DMA engine 1110 consists of the data writing unit (DataWrite) 1115 which serves as DMA write bus master for moving the received data that is stored in the data receive buffer (RxBuf) 1120, to its respective place in the system memory. The data receive buffer 1120 may be a simple FIFO buffer.

The enhanced host controller of FIG. 11 further comprises a frame timing unit (FrameTiming) 1190 that is the master USB time reference. The frame timing unit 1190 is connected to the descriptor storage unit 1140 and to the packet handler block 1165.

The packet handler block 1165 consists of a packet building unit (PktBuild) 1180 that constructs the necessary USB bus operations to transmit data and handshakes, and a packet decoder (PktDecode) 1170 that disassembles received USB packets. Further, a transaction controller (TaCtrl) 1175 is provided that supervises the packet building unit 1180 and the packet decoder 1170. Further, the packet handler 1165 comprises a CRC (Cyclic Redundancy Check) unit 1185 for generating and checking CRC data for transmitted and received data.

The packet building unit 1180 and the packet decoder 1170 of the packet handler 1165 are connected to the root hub 1195 that contains port specific control registers, connect detection logic and scatter/gather functionality for packets between the packet handler 1165 and the port router.

Figure 12:
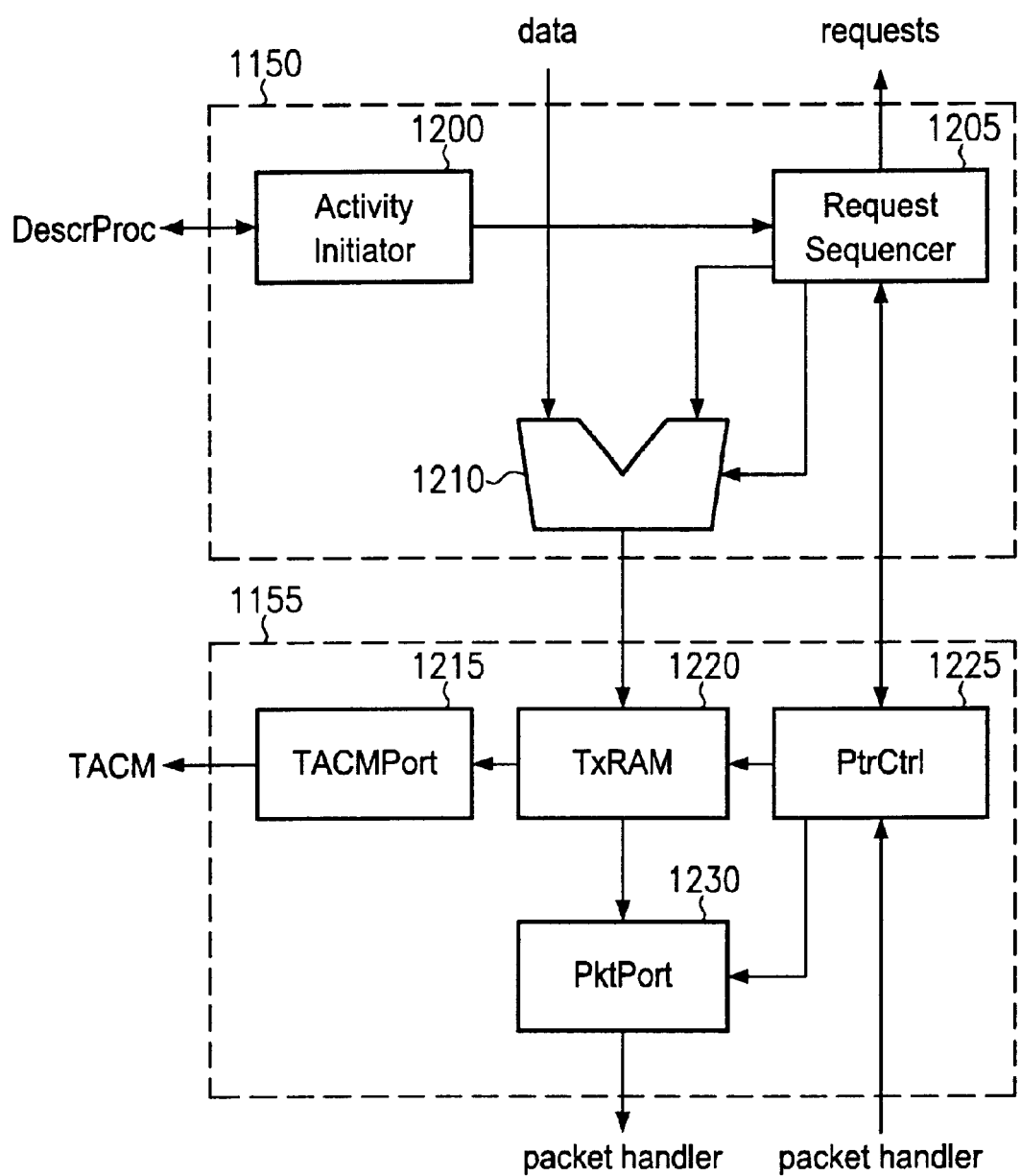
FIG. 12 illustrates the components of the transmit DMA engine of the enhanced host controller of FIG. 11.

Turning now to FIG. 12 which illustrates in more detail the transmit DMA engine 1145, the unit mainly consists of the data fetching unit 1150 and the data transmit buffer 1155. The data fetching unit 1150 comprises an activity initiator 1200 for interacting with the descriptor processing unit 1125 to determine which stored descriptor it will fetch the corresponding data for. There is further a connection to the stub 1100 where the data fetching unit 1150 has to compete with other units for memory access. Once granted, data is then moved to the data transmit buffer 1155.

The data fetching unit 1150 further comprises a request sequencer 1205 which is a control unit for ensuring that all conditions are met such as buffer load, memory interface access constraints, transfer size, etc. Control may further be complicated by dynamic schedule management, in that the buffer has to be flushed when at the end of a micro frame there is no more time to send asynchronous data already pre-fetched.

The data transmit buffer 1155 of the present embodiment is a dual-port RAM (TxRAM) 1220 with some control logic: the pointer controller unit (PtrCtrl) 1225 and the packet port unit (PktPort) 1230. The packet port unit 1230 serves as interface to the packet handler 1165, and mainly contains status bits telling the packet handler 1165 that all data for a packet is fetched, and information on the packet size and the byte alignment for the very first data dword. These status bits will be multiplexed into the dual-port RAM 1220 ahead of the first dword of each data packet and extracted into the packet port unit 1230 when a data packet becomes the head of the buffer. Similarly, the TACM port unit (TACMPort) 1215 propagates these status bits to the transaction completion machine 1135 for status write back.

The transmit DMA engine 1145 may have a special mode for single bulk transfer descriptors. In order to increase efficiency, it may tentatively pre-fetch data for more than one visit of that descriptor, i.e. asynchronous queue traversal.

Figure 13:
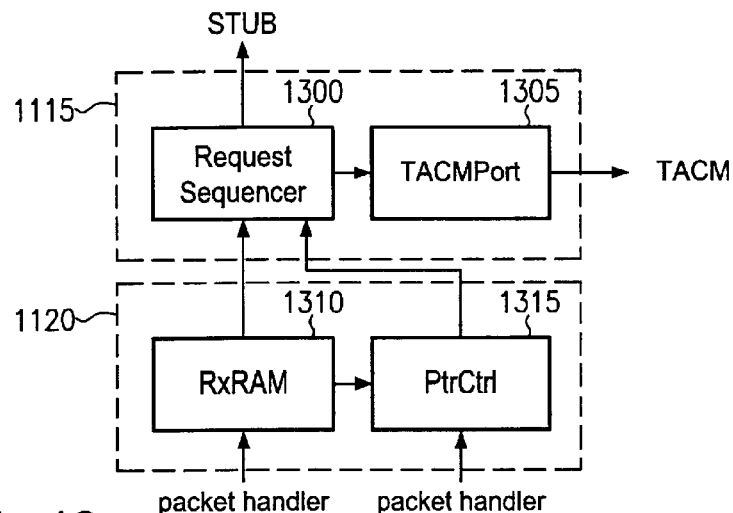
FIG. 13 illustrates the components of the receive DMA engine of the enhanced host controller of FIG. 11.

Turning now to FIG. 13, the receive DMA engine 1110 of the present embodiment consists of four main units: the actual buffer is contained in the data receive RAM (RxRAM) 1310 and controlled by pointer controller (PtrCtrl) 1315. Similar to the transmit DMA engine 1145, there is a request sequencer 1300 that builds the memory interface command. Finally, a TACM port unit 1305 provides the transaction completion machine 1135 with status information.

Figure 14:
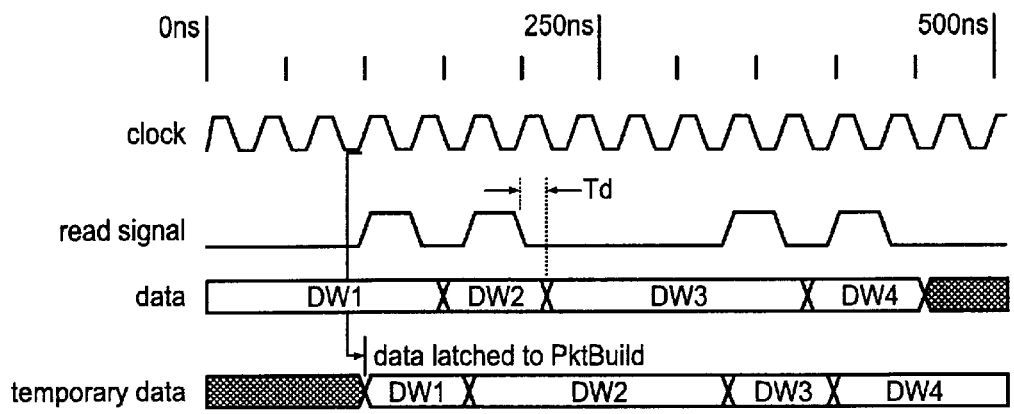
FIG. 14 is a timing chart illustrating the interface timing between the packet handler and the transmit DMA engine of FIG. 12.
Figure 15:
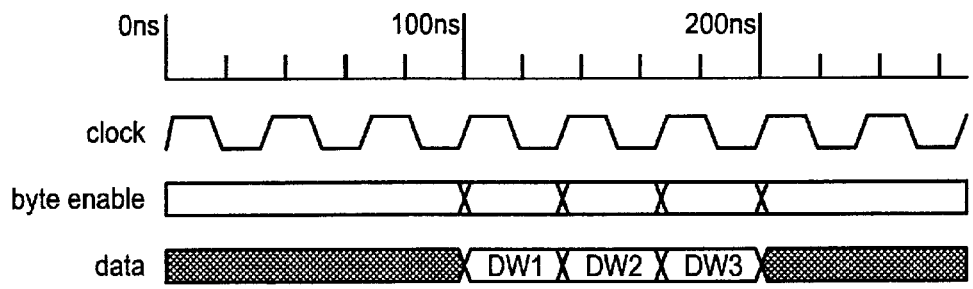
FIG. 15 is a timing chart illustrating the interface timing between the packet handler and the receive DMA engine of FIG. 13.

FIGS. 14 and 15 are timing charts illustrating the interface timing between the packet handler 1165 and the transmit and receive DMA engines 1145, 1110. Turning first to FIG. 14, the packet building unit 1180 which is part of the packet handler 1165 will latch the data from the transmit DMA engine 1145 at the same time it asserts the read signal. The transmit DMA engine 1145 may then increment its read pointer if the read signal goes to one, and may apply the next data within time interval Td which is less than one clock cycle. The read signal has a length of one clock period. The idle time between two read pulses is at least one clock cycle.

The timing of the interface between the packet handler 1165 and the receive DMA engine 1110 is shown in FIG. 15. There may exist no handshake between the receive DMA engine 1110 and the packet handler 1165. The packet handler 1165 will apply the byte enable signal at the same time as the data. The byte enable signal can then be used to perform byte-wide write operations to the RAM. There may further be no dedicated valid signal to show the receive DMA engine 1110 that the data is valid. This can be derived by the byte enable signal.

In the following, the functioning of the transmit and the receive DMA engines 1145, 1110 will be explained in more detail. First, it is referred to the transmit DMA engine 1145.

The activity initiator 1200 will inquire the descriptor processing unit 1125 for the next outgoing descriptor and provide the request sequencer 1205 with the respective start address and length of the output data. The request sequencer 1205 in turn will build all necessary memory interface commands to fetch the data. In the present embodiment the data packets must not be greater than a cache line (i.e. 64 bytes) and must not cross cache line boundaries, so that data fetches have to be broken up into several requests. The algorithm listed below is used to accomplish this:

```
if TotalBytes == 0 then exit
addr : = concat (page(c_page), offset)
cl_addr := addr[31:6] // cache line address (64 byte aligned)
bias := addr[5:2] // dword offset within cache line
pre := 2's complement of addr[1:0]
         // number of bytes in first incomplete dword
dw_cnt := (TotalBytes-pre+3) >> 2
if (pre > 0) then dw_cnt += 1 // number of dwords to fetch
do {
    mem_addr := concat (cl_addr, bias)
    if !bias > dw_cnt then // rest of cache line > dwords
        portion := dw_cnt-1
    else
        portion := !bias
        if cl_addr[11:6] == '111111' then // page boundary crossing
            cl_addr := concat (page (c_page + 1), '000000')
        else
            cl_addr += 1
        bias := 0
    }
    request 'portion' dwords at address 'mem_addr'
    dw_cnt -= (portion +1) // effectively add 1's complement of portion
} while (dw_cnt > 0)
```

Basically, the total transfer length may be rounded up to full dwords. Then, the first access establishes cache line alignment and all succeeding accesses may use complete cache line bursts, except for possibly the very last access. Unused byte(s) within the very first and the very last dword are dropped within the packet handler 1165.

In order to increase efficiency and minimize memory latency, the transmit DMA engine 1145 may autonomously fetch all packets for high-bandwidth transfers. It is enabled to do so by receiving all necessary information from the descriptor processing unit 1125. Instead of handling the up to three packets for a high-bandwidth transfer independently, which would lead to multiple incomplete bursts and address re-alignments, the transmit DMA engine 1145 may handle these maximum three packets as one single data stream to be requested from the memory interface. Therefore, only one cache line address alignment at the begin (with one incomplete burst) and possibly a final incomplete burst will occur. However, the transmit DMA engine 1145 may keep track of the packetization, i.e. it may store the data portions separately in its buffer 1155 and tag all of them with the same descriptor tag. This is to be able to flush following packets of such a high-bandwidth transfer if the first or the intermediate transaction failed. Further, this is also to keep the packet-oriented interface to the packet handler 1165.

As mentioned, the transmit DMA engine 1145 of the present embodiment may be operated in a single bulk cache mode. This is a special mode entered when serving the asynchronous queue and there is only one descriptor in it. This state is flagged to the transmit DMA engine 1145 by the descriptor processing unit 1125. It is a special mode in order to avoid the latency normally incurred by this loop: fetch the (single) descriptor, carry out the transaction, write back the status. Since the next fetch of the descriptor and the respective data could only be done after status write back there would virtually be no data pre-fetching anymore. Therefore the transmit DMA engine 1145 is requested to handle the data pre-fetching autonomously.

It is similar to the high-bandwidth transfer handling described above with a multiplicity factor (much) greater than three. However, there may be some extensions to that mode. For instance, the number of packets to be pre-fetched may not be known in advance. Further, the transfer length may exceed the capacity of the memory pages. The transmit DMA engine 1145 may therefore keep track of the addresses internally, i.e. keep on fetching until either the correct number of bytes are read or the next read of the maximum packet size of bytes would exceed even the secondary memory page. If the latter is the case, the transmit DMA engine 1145 may keep requesting from the descriptor processing unit 1125 but may ignore all addresses given back until the secondary page has become the primary and a new secondary page is given back. When in single bulk cache mode, the transmit DMA engine 1145 may reserve at least 512 bytes of its buffer for a new periodic transfer that might follow. This rule is to ensure that after returning from the asynchronous schedule (with only that one descriptor) data can be pre-fetched for the periodic schedule starting again with the next micro frame.

While the last mentioned algorithm and special operation modes relate to the transmit DMA engine 1145, the request sequencer 1300 of the data writing unit 1115 of the receive DMA unit 1110 may execute the following algorithm to form the memory interface commands and handle all Hyper-Transport access constraints:

```
if TotalBytes == 0 then exit
bcnt := TotalBytes
addr := concat (page(c_page), offset)
do {
    if (64-addr[5:0]) > bcnt then
        maxp := bcnt // maximal portion limited by length
    else
        maxp := 64-addr[5:0]
             // maximal portion limited by cache line boundary
    mem_addr = concat (addr[31:2], '00')
    if (addr[1:0] | maxp[1:0] ) == 0 then { // dword aligned on both ends
        portion := (maxp >> 2) - 1
        wait until RxRAM contains 'portion' dwords
        write 'portion' dwords at 'mem_addr'
        bcnt -= maxp
        addr += maxp
    {
    else if maxp <= 32-addr[1:0] then { // masked write is all
        pre := 2's complement of addr[1:0]
        portion := (maxp-pre) >> 2
        if addr[1:0] != 0 then portion += 1
        mask := BitMask(maxp) << addr[1:0]
        wait until RxRAM contains 'portion+1' dwords
        write 'portion' masked dwords at 'mem_addr'
        bcnt -= maxp
        addr += maxp
    {
    else if addr[1:0] != 0 then { // start with 1-3 byte masked write
        mask := BitMask (4-addr[1:0]) << addr[1:0]
        wait until RxRAM contains 1 dword
        write one masked dword at 'concat (addr[31:2], '00')'
        bcnt -= (4-addr[1:0] )
        addr += (4-addr[1:0] )
    }
    else { // start with sized dword write
        portion := (maxp >> 2) - 1
        wait until RxRAM contains 'portion+1' dwords
        write 'portion' dwords at 'mem_addr'
        bcnt -= (maxp & 3Ch)
        addr += (maxp & 3Ch)
    }
} while (bcnt > 0)
BitMask (len[5:0] ) {
    len -= 1
    mask := 00000000h
    if len[4] = 1 then
        mask := 0000FFFFh
    if len[3] = 1 then
        mask := (mask << 8) | FFh
    if len[2] = 1 then
        mask := (mask << 4) | Fh
```

-continued

```
    if len[1] = 1 then
        mask := (mask << 2) | 3
    if len[0] = 1 then
        mask := (mask << 1) | 1
    return mask
}
```

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A DMA (Direct Memory Access) controller device having a transmit DMA engine for outputting read requests to a memory interface and receiving requested data from the memory interface, said transmit DMA engine comprising:
   a data transfer initiating unit for initiating a data transfer by determining which data is to be fetched from memory and outputting first address data identifying a first memory range, the first memory range containing the determined data to be fetched;
   a boundary alignment unit for receiving the first address data, generating second address data therefrom, and outputting the second address data, the second address data identifying at least one second memory range that differs from the first memory range in at least one boundary; and
   a read request building unit for receiving the second address data and generating at least one read request based thereon.

2. The DMA controller device of claim 1, wherein said boundary alignment unit is arranged for generating said second address data by aligning said first address data to cache line boundaries of a cache of said memory interface.

3. The DMA controller device of claim 2, wherein said cache line boundaries are boundaries of 64-byte cache lines.

4. The DMA controller device of claim 2, wherein said boundary alignment unit is arranged for generating said second address data such that said read request building unit is capable of generating said at least one read request based on said second address data for not fetching any data that is not determined by said data transfer unit.

5. The DMA controller device of claim 4, wherein said boundary alignment unit is arranged for masking bits in said first address data when generating said second address data.

6. The DMA controller device of claim 1, wherein said boundary alignment unit is arranged for generating said second address data by aligning said first address data to double word boundaries.

7. The DMA controller device of claim 6, wherein said boundary alignment unit is arranged for generating said second address data such that said read request building unit is capable of generating said at least one read request based on said second address data for not fetching any data that is not determined by said data transfer unit.

8. The DMA controller device of claim 7, wherein said boundary alignment unit is arranged for masking bits in said first address data when generating said second address data.

9. The DMA controller device of claim 1, wherein said second address data generated from said first address data identifies at least two second memory ranges, and said read request building unit is arranged for generating at least two read requests for requesting the determined data.

10. The DMA controller device of claim 9, wherein said at least two second memory ranges are comprised in said first memory range.

11. The DMA controller device of claim 1, wherein said boundary alignment unit is arranged for masking bits in said first address data when generating said second address data.

12. The DMA controller device of claim 11, wherein the first address data includes a base address, and said boundary alignment unit is arranged for masking bits in said base address when generating said second address data.

13. The DMA controller device of claim 11, wherein the first address data includes size data indicating the number of bytes to be read, and said boundary alignment unit is arranged for masking bits in said size data when generating said second address data.

14. The DMA controller device of claim 1, wherein said at least one second memory range includes a sub-range not included in said first memory range.

15. The DMA controller device of claim 14, wherein said DMA controller device is arranged for skipping data read from said sub-range.

16. The DMA controller device of claim 1, wherein the first address data includes a base address and size data, the size data indicating the total transfer length of the data to be fetched.

17. The DMA controller device of claim 16, wherein said boundary alignment unit is arranged for rounding up the total transfer length to full double words when generating said second address data.

18. The DMA controller device of claim 1, wherein the second address data includes a base address and size data, the size data indicating the number of bytes to be read.

19. The DMA controller device of claim 18, further comprising an up counter for calculating the base address for each of said at least one read requests.

20. The DMA controller device of claim 18, further comprising a down counter for keeping track of the number of outstanding bytes to be read.

21. The DMA controller device of claim 1, further comprising:
   a response receiving unit for receiving data out of order in response to said at least one read request; and
   a response reordering unit for changing the order in which the data are received.

22. The DMA controller device of claim 21, further comprising a buffer for storing the received data in the changed order.

23. The DMA controller device of claim 1, capable of being operated in a high-bandwidth transfer handling mode in which said data transfer initiating unit automatically initiates high-bandwidth transfers by combining at least two data transfers relating to different memory ranges so that the combined data transfer is handled by the DMA controller device as one single data stream.

24. The DMA controller device of claim 23, further comprising a buffer for separately storing data portions relating to the different memory ranges, each of the data portions stored in the buffer having a descriptor tag associated, the descriptor tags of those data portions which relate to one and the same combined data transfer being the same.

25. The DMA controller device of claim 1, wherein said data transfer initiating unit is arranged to receive transaction item information from a data queue that stores descriptors, for determining which data is to be fetched.

26. The DMA controller device of claim 1, wherein said data transfer initiating unit is arranged for initiating data transfers asynchronously in response to descriptors received from an asynchronous descriptor queue, the DMA controller device being capable of operating in a single bulk cache mode when serving the asynchronous descriptor queue and the asynchronous descriptor queue contains only one descriptor, said data transfer initiating unit being arranged for prefetching data autonomously.

27. The DMA controller device of claim 26, wherein:
said data transfer initiating unit is further arranged for initiating data transfers periodically in response to descriptors received from a periodic descriptor queue; and
the DMA controller device comprises a buffer including a buffer region of predetermined size, said buffer region being reserved when the DMA controller device operates in the single bulk cache mode for enabling prefetching of data for the periodic schedule when returning from the asynchronous schedule.

28. The DMA controller device of claim 1, further comprising:
a first-in first-out buffer for storing the requested and received data;
a data transmission interface unit for providing an interface to a device driver, the DMA controller device being arranged for transmitting the requested and received data to said data transmission interface unit; and
a flag storage unit for storing an all-data-present flag for indicating when the first-in first-out buffer stores all data for a given transaction.

29. The DMA controller device of claim 1, further comprising:
a first-in first-out buffer for storing the requested and received data;
a data transmission interface unit for providing an interface to a device driver, the DMA controller device being arranged for transmitting the requested and received data to said data transmission interface unit; and
a flag storage unit for storing a packet boundary flag corresponding to the QTAG (queue tag) bit of a given transaction.

30. The DMA controller device of claim 1, being arranged for handling the data traffic in a USB (Universal Serial Bus) host controller between at least one USB device and a system memory of a computer system.

31. The DMA controller device of claim 30, wherein the USB host controller is USB-2 compliant.

32. A DMA (Direct Memory Access) controller device having a receive DMA engine for writing data to a memory interface, said receive DMA engine comprising:
a write command building unit for determining which data is to be written to memory, determining first address data identifying a first memory range, the first memory range being the memory range to which the determined data is to be written, and building at least one write command to write the determined data,
wherein the write command building unit includes a boundary alignment unit for generating second address data based on the first address data, the second address data identifying at least one second memory range that differs from the first memory range in at least one boundary, the write command building unit being arranged for building the at least one write command to write the determined data to the at least one second memory range.

33. The DMA controller device of claim 32, wherein said boundary alignment unit is arranged for generating said second address data by aligning said first address data to cache line boundaries of a cache of said memory interface.

34. The DMA controller device of claim 33, wherein said cache line boundaries are boundaries of 64-byte cache lines.

35. The DMA controller device of claim 33, wherein said boundary alignment unit is arranged for generating said second address data such that said read request building unit is capable of generating said at least one read request based on said second address data for not fetching any data that is not determined by said data transfer unit.

36. The DMA controller device of claim 35, wherein said boundary alignment unit is arranged for masking bits in said first address data when generating said second address data.

37. The DMA controller device of claim 32, wherein said boundary alignment unit is arranged for generating said second address data by aligning said first address data to double word boundaries.

38. The DMA controller device of claim 37, wherein said boundary alignment unit is arranged for generating said second address data such that said read request building unit is capable of generating said at least one read request based on said second address data for not fetching any data that is not determined by said data transfer unit.

39. The DMA controller device of claim 38, wherein said boundary alignment unit is arranged for masking bits in said first address data when generating said second address data.

40. The DMA controller device of claim 32, wherein said second address data generated from said first address data identifies at least two second memory ranges, and said read request building unit is arranged for generating at least two read requests for requesting the determined data.

41. The DMA controller device of claim 40, wherein said at least two second memory ranges are comprised in said first memory range.

42. The DMA controller device of claim 32, wherein said boundary alignment unit is arranged for masking bits in said first address data when generating said second address data.

43. The DMA controller device of claim 42, wherein the first address data includes a base address, and said boundary alignment unit is arranged for masking bits in said base address when generating said second address data.

44. The DMA controller device of claim 42, wherein the first address data includes size data indicating the number of bytes to be read, and said boundary alignment unit is arranged for masking bits in said size data when generating said second address data.

45. The DMA controller device of claim 32, wherein said at least one second memory range includes a sub-range not included in said first memory range.

46. The DMA controller device of claim 45, wherein said DMA controller device is arranged for skipping data read from said sub-range.

47. The DMA controller device of claim 32, wherein the first address data includes a base address and size data, the size data indicating the total transfer length of the data to be fetched.

48. The DMA controller device of claim 47, wherein said boundary alignment unit is arranged for rounding up the total transfer length to full double words when generating said second address data.

49. The DMA controller device of claim 32, wherein the second address data includes a base address and size data, the size data indicating the number of bytes to be read.

50. The DMA controller device of claim 49, further comprising an up counter for calculating the base address for each of said at least one read requests.

51. The DMA controller device of claim 49, further comprising a down counter for keeping track of the number of outstanding bytes to be read.

52. The DMA controller device of claim 32, being arranged for handling the data traffic in a USB (Universal Serial Bus) host controller between at least one USB device and a system memory of a computer system.

53. The DMA controller device of claim 52, wherein the USB host controller is USB-2 compliant.

54. A USB (Universal Serial Bus) host controller for handling the data traffic between at least one USB device and a system memory of a computer system, the USB host controller comprising a transmit and/or receive DMA (Direct Memory Access) engine, the transmit DMA engine being arranged for outputting read requests to a memory interface and receiving requested data from the memory interface, the receive DMA engine being arranged for writing data to the memory interface, said transmit and/or receive DMA engine comprising:

an address data generating unit for generating and outputting first address data identifying a first memory range, the first memory range containing the determined data to be fetched, or being the memory range to which the determined data is to be written; and a boundary alignment unit for receiving the first address data and generating second address data therefrom, the second address data identifying at least one second memory range that differs from the first memory range in at least one boundary.

55. A method of operating a DMA (Direct Memory Access) engine to handle the data traffic between at least one peripheral device and a system memory of a computer system, the method comprising:

determining first address data identifying a first memory range;

determining whether the first memory range is boundary aligned; and if the first memory range is not boundary aligned, generating second address data from the first address data, the second address data identifying at least one second memory range that differs from the first memory range in at least one boundary.

56. The method of claim 55, wherein said step of generating said second address data comprises:

aligning said first address data to cache line boundaries of a cache of said memory interface.

57. The method of claim 56, wherein said cache line boundaries are boundaries of 64-byte cache lines.

58. The method of claim 56, wherein said step of generating said second address data comprises:

masking bits in said first address data.

59. The method of claim 55, wherein said step of generating said second address data comprises:

aligning said first address data to double word boundaries.

60. The method of claim 59, wherein said step of generating said second address data comprises:

masking bits in said first address data.

61. The method of claim 55, wherein said second address data generated from said first address data identifies at least two second memory ranges, and said step of generating said second address data comprises:

generating at least two read requests for requesting the determined data.

62. The method of claim 61, wherein said at least two second memory ranges are comprised in said first memory range.

63. The method of claim 55, wherein said step of generating said second address data comprises:

masking bits in said first address data.

64. The method of claim 63, wherein the first address data includes a base address, and said step of generating said second address data comprises:

masking bits in said base address when generating said second address data.

65. The method of claim 63, wherein the first address data includes size data indicating the number of bytes to be read, and said step of generating said second address data comprises:

masking bits in said size data when generating said second address data.

66. The method of claim 55, wherein said at least one second memory range includes a sub-range not included in said first memory range.

67. The method of claim 66, further comprising:

skipping data read from said sub-range.

68. The method of claim 55, wherein the first address data includes a base address and size data, the size data indicating the total transfer length of the data to be fetched.

69. The method of claim 68, wherein said step of generating said second address data comprises:

rounding up the total transfer length to full double words when generating said second address data.

70. The method of claim 55, wherein the second address data includes a base address and size data, the size data indicating the number of bytes to be read.

71. The method of claim 55, being arranged for handling the data traffic in a USB (Universal Serial Bus) host controller between at least one USB device and a system memory of a computer system.

72. The method of claim 71, wherein the USB host controller is USB-2 compliant.

* * * * *